Patented Feb. 20, 1923.

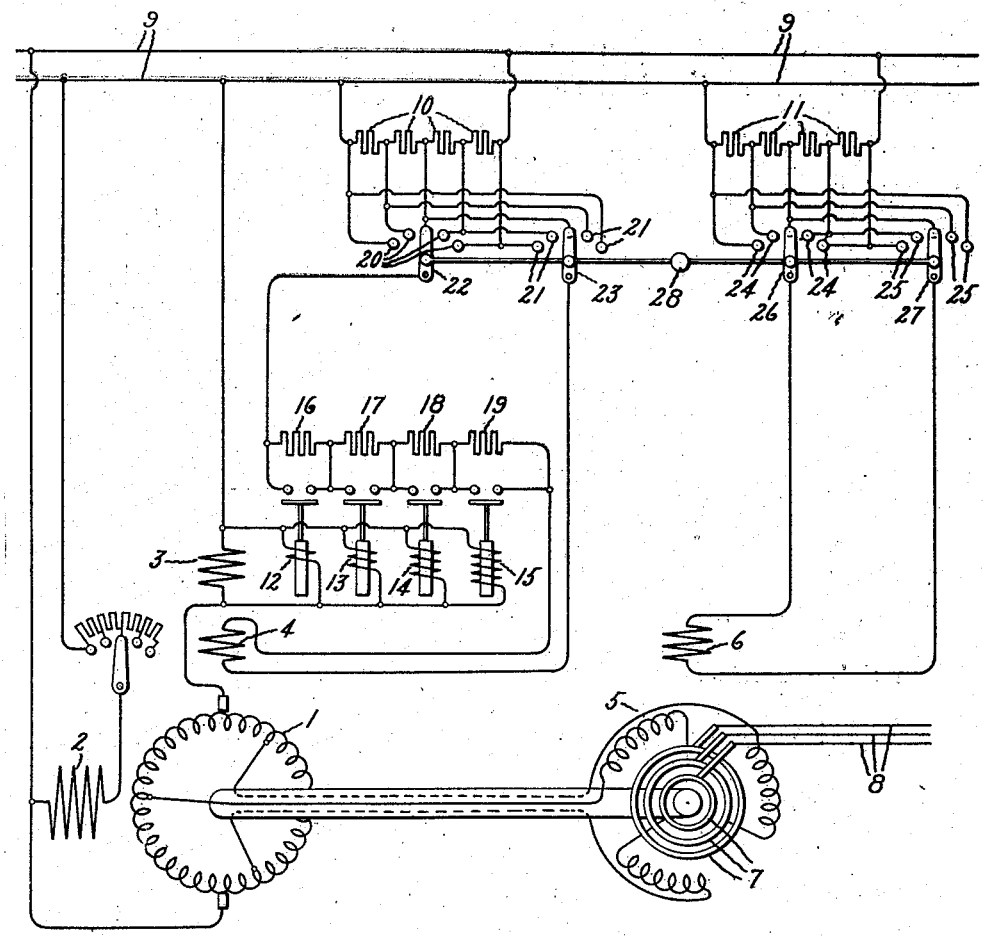

1,446,005

UNITED STATES PATENT OFFICE.

HERMANN F. T. ERBEN, OF SCHENECTADY, NEW YORK, ASSIGNOR TO GENERAL ELECTRIC COMPANY, A CORPORATION OF NEW YORK.

ROTARY CONVERTER.

Application filed October 17, 1913. Serial No. 795,793.

*To all whom it may concern:*

Be it known that I, HERMANN F. T. ERBEN, a citizen of the United States, residing at Schenectady, in the county of Schenectady, State of New York, have invented certain new and useful Improvements in Rotary Converters, of which the following is a specification.

My invention relates to rotary converters, and particularly to rotary converters provided with commutating poles and operated in connection with boosters mechanically connected thereto, the field of the boosters being variable for the purpose of varying the ratio between the alternating and direct current voltages. When a booster is mechanically connected to a rotary converter, it imposes a motor load on the converter when boosting and a generator load on the converter when bucking; or, in other words, when the booster is boosting the voltage of the converter it must be driven as a generator by the converter, but when operating to buck the converter voltage the booster operates as a motor transmitting mechanical energy to the converter. Under such conditions the effective armature reaction of the rotary converter varies through wide limits and directly affects the magnetization of the commutating poles. The armature reaction caused by the booster when boosting the converter voltage is in a direction to aid the commutation of the converter, whereas under the bucking condition the armature reaction caused by the booster is in a direction prejudicial to commutation.

My invention has for its object, the provision of improved means by which the strength of the commutating field may be automatically adjusted to the correct value under different conditions of buck and boost. The arrangement to which my improvement relates comprises a booster type rotary converter having commutating poles provided with a series commutating field winding and an auxiliary commutating field winding, means for simultaneously varying and reversing the field produced by the auxiliary commutating field winding and the field produced by the field winding of the booster, and means for further varying the field produced by the auxiliary commutating field winding in accordance with variations in load on the rotary converter.

Without the last mentioned means, a booster type rotary converter will only have the correct value of commutating field at a given load, because if the field produced by the auxiliary commutating field winding is varied only as the field produced by the field winding of the booster is varied, there will be no correction of the auxiliary commutating field with variations in load on the converter, but only with changes of the voltage of the converter.

The various features of novelty which characterize my invention are pointed out with particularity in the claims annexed to and forming a part of this specification. For a better understanding of my invention, however, reference may be had to the following description taken in connection with the accompanying drawing, in which the single figure shows diagrammatically one embodiment of my invention.

Referring to the drawing, 1 is a rotary converter having a main exciting winding 2, a series commutating field winding 3 and an auxiliary commutating field winding 4. The rotary converter is mechanically connected to a booster 5 having a field winding 6. The booster is shown as being of the synchronous type connected through collector rings 7 to alternating current mains 8 and having its alternating current windings connected to the armature winding of the converter. The armature winding of the converter is shown as being connected to the direct current mains 9. The auxiliary commutating field winding 4 and the field winding 6 of the booster are also shown as being connected in parallel to the direct current mains 9. The field produced by the auxiliary commutating field winding 4 and the field produced by the field winding 6 are varied and reversed simultaneously by varying and reversing the voltage applied thereto. I preferably accomplish this by means of two sets of resistances 10 and 11 connected across the direct current mains 9, as will be hereinafter explained. In practice, the number of resistances in each set will be considerably greater than that shown. In order to change the field produced by the auxiliary commutating field winding of the converter with the load on the converter, as explained above, I have shown in the drawing a series of relays 12, 13, 14 and 15 connected across the series commutating field winding 3, which successively cut out resistances 16, 17, 18 and 19 in the auxiliary commutating field winding circuit upon an increase in the load on the rotary converter and cut them in again with a decrease in the load on the converter. The relays 12, 13, 14 and 15 are shown as being provided with different numbers of turns, relay 12 with the least number and relay 15 with the greatest number. It will therefore take a much higher voltage to operate relay 12 than relay 15. These relays are operated by the voltage drop across the series commutating field winding 3 and therefore depend upon the load on the rotary converter. I have found it desirable to have all the resistances 16, 17, 18 and 19 in the auxiliary commutating field winding circuit until 55% of full load is being delivered by the converter, whereupon relay 15 operates to short-circuit resistance 19 and thus strengthens the auxiliary commutating field winding. Relay 14 operates at 85% of full load to short-circuit resistance 18, relay 13 operates at 115% of full load, and relay 12 operates at 135% of full load, at which load all of these resistances will be cut out of circuit. If desired a greater number of relays may be employed which cut in and out resistances at smaller increments of load, but I have found that four were sufficient for practical operating conditions.

The set of resistances 10 is connected to two rows of contacts 20 and 21, the terminals of the auxiliary commutating field winding are connected to arms 22 and 23, which are rigidly connected together and engage the two rows of contacts 20 and 21, respectively. When these arms engage the extreme left hand contacts, the full voltage of the mains is applied to the field winding 4 in one direction. By moving the arms to the adjacent contacts, a fraction of the voltage of the mains is applied to the winding 4. When the arms engage the middle contacts, no voltage is applied to the winding 4. A further movement of the arms toward the right, applies a voltage to the winding 4 which is in the opposite direction to that which was applied when the arms engaged contacts to the left of the middle, and when the arms engage the extreme right hand contacts full voltage is applied in the opposite direction to that applied when the arms engaged the extreme left hand contacts.

Similarly, the set of resistances 11 is connected to two rows of contacts 24 and 25, and the terminals of the field winding of the booster are connected to arms 26 and 27, which are rigidly connected together and engage the rows of contacts 24 and 25. The voltage applied to the field winding 6 is varied and reversed in the same way as described above in connection with field winding 4 of the converter. The arms 22 and 23 are not only rigidly connected together, as are the arms 26 and 27, but the two sets of arms are rigidly connected together so that the voltage applied to field windings 4 and 6 is simultaneously varied and reversed. The two sets of arms may be operated by a handle 28.

Assume now that the booster is neither bucking or boosting, in which case the arms 22, 23, 26 and 27 are in their mid positions and neither windings 4 or 6 have any voltage applied to them. If it is desired to raise the voltage delivered by the rotary converter, the arms 26 and 27 are moved in such a direction that a voltage is applied to the field winding of the booster so that it operates as a generator, and simultaneously a voltage is applied to the auxiliary commutating field winding so that the field produced by it opposes the field produced by the series commutating field winding. With the windings arranged as shown in the drawing, the arms are moved to the right of their mid positions for the boost condition. If it is desired to lower the voltage delivered by the rotary converter, the arms are moved in the opposite direction from the mid position, in which case, the booster operates as a motor and the field produced by the auxiliary commutating field winding assists the field produced by the series commutating field winding. As pointed out above, this regulation of the commutating field only takes care of the variations in the armature reaction due to the generator or motor load of the booster, and in order to have the field produced by the auxiliary commutating field winding also vary with changes in the load on the converter, the resistances 16, 17, 18 and 19 must be cut in and out of this field winding circuit with variations in load on the converter.

While I have shown the booster 5 as being of the synchronous type, it is obvious that it might be of any well known type, and I aim in the claims hereto appended, to cover such a modification as well as any other modifications of my rotary converter, that do not depart from the spirit and scope of my invention.

What I claim as new and desire to secure by Letters Patent of the United States, is:—

1. The combination with a rotary converter provided with a main field winding and with series and auxiliary commutating field windings, of a booster mechanically coupled and electrically connected thereto and provided with a field winding, parallel connections from said auxiliary field winding and from said booster field winding to a source of direct current, means for simultaneously adjusting the strength and direction of the exciting current supplied to said auxiliary and booster field windings, and means for independently adjusting the exciting current supplied to said auxiliary field winding in accordance with the load on said rotary converter.

2. The combination with a rotary converter provided with a main field winding and with series and auxiliary commutating field windings, of a booster mechanically coupled and electrically connected thereto and provided with a field winding, connections from said auxiliary field winding and from said booster field winding to a source of direct current, means for simultaneously adjusting the strength and direction of the exciting current supplied to said auxiliary and booster field windings, and means for independently adjusting the exciting current supplied to said auxiliary field winding in accordance with the voltage across said series field winding.

3. The combination with a rotary converter provided with a main field winding and with series and auxiliary commutator field windings, of a booster mechanically coupled and electrically connected thereto and provided with a field winding, parallel connections from said auxiliary field winding and from said booster field winding to a source of direct current, means for simultaneously adjusting the strength and direction of the exciting current supplied to said auxiliary and booster field windings, and means for independently increasing the current in said auxiliary field winding upon an increase in the converter load and for decreasing the current in said auxiliary field winding upon a decrease in the converter load.

4. In combination, a rotary converter having a series commutating field winding and an auxiliary commutating field winding, a booster mechanically connected to said converter having a field winding, means for simultaneously varying and simultaneously reversing the field produced by said auxiliary commutating field winding and the field produced by the field winding of said booster, and means comprising a plurality of relays depending on the load on said converter for further varying the field produced by said auxiliary commutating field winding.

5. In combination, direct current mains, a rotary converter having a series commutating field winding, and an auxiliary commutating field winding, a booster mechanically connected to said converter having a field winding, means for simultaneously varying and simultaneously reversing the voltage applied to said auxiliary commutating field winding and the voltage applied to the field winding of said booster, and means connected across said series commutating field winding and dependent on the load on said converter for further varying the field produced by said auxiliary commutating field winding.

6. In combination, direct current mains, a rotary converter having a series commutating field winding and an auxiliary commutating field winding, a booster mechanically connected to said converter having a field winding, two sets of resistances connected across said mains, said auxiliary commutating field winding of said converter being connected across one of said sets of resistances, said field winding of said booster being connected across the other of said sets of resistances, means for simultaneously changing the connections of said windings to said resistances and for simultaneously reversing said windings, and means connected across said series commutating field winding and dependent on the load on said converter for further varying the field produced by said auxiliary commutating field winding.

7. In combination, direct current mains, a rotary converter, a series commutating field winding on said rotary converter, an auxiliary commutating field winding on said converter connected to said mains, a booster mechanically connected to said converter, a field winding for said booster connected to said mains in parallel with said auxiliary commutating field winding, means for simultaneously varying the voltage applied to said booster field winding and the voltage applied to the auxiliary commutating field winding on said converter and for simultaneously reversing the booster field winding and the auxiliary commutating field winding so that said auxiliary commutating field winding opposes said series commutating field winding when the booster operates as a generator and assists said series commutating field winding when the booster operates as a motor, and means connected across said series field winding and dependent on the load on said converter for further varying the field produced by said auxiliary commutating field winding.

8. In combination, direct current mains, a rotary converter, a series commutating field winding on said rotary converter, an auxiliary commutating field winding on said converter connected to said mains, a booster mechanically connected to said converter, a field winding for said booster connected to said mains in parallel with said auxiliary commutating field winding, means for simultaneously varying the voltage applied to said booster field winding and the voltage applied to the auxiliary commutating field winding on said converter and for simultaneously reversing the booster field winding and the auxiliary commutating field winding so that said auxiliary commutating field winding opposes said series commutating field winding when the booster operates as a generator and assists said series commutating field winding when the booster operates as a motor, and means dependent on the load on said converter for further varying the field produced by said auxiliary commutating field winding.

9. In combination, direct current mains, a rotary converter having a series commutating field winding and an auxiliary commutating field winding, a booster mechanically connected to said converter having a field winding, two sets of resistances connected across said mains, said auxiliary commutating field winding of said converter being connected across one of said sets of resistances, said field winding of said booster being connected across the other of said sets of resistances, means for simultaneously changing the connections of said windings to said resistances and for simultaneously reversing said windings, and means dependent on the load on said converter for further varying the field produced by said auxiliary commutating field winding.

10. In combination, direct current mains, a rotary converter, a series commutating field winding on said rotary converter, an auxiliary commutating field winding on said converter connected to said mains, a booster mechanically connected to said converter, a field winding for said booster connected to said mains in parallel with said auxiliary commutating field winding, means for simultaneously varying the voltage applied to said booster field winding and the voltage applied to the auxiliary commutating field winding on said converter and for simultaneously reversing the booster field winding and the auxiliary commutating field winding so that said auxiliary commutating field winding opposes said series commutating field winding when the booster operates as a generator and assists said series commutating field winding when the booster operates as a motor, and means dependent on the load on said converter for varying the current in said auxiliary commutating field winding.

11. In combination, direct current mains, a rotary converter having a series commutating field winding and an auxiliary commutating field winding, a booster mechanically connected to said converter having a field winding, means for simultaneously varying and simultaneously reversing the voltage applied to said auxiliary commutating field winding and the voltage applied to the field winding of said booster, resistances in the circuit of the auxiliary commutating field winding, and means dependent on the load on said converter for cutting in and out said resistances in the auxiliary commutating field winding circuit.

12. In combination, direct current mains, a rotary converter, a series commutating field winding on said rotary converter, an auxiliary commutating field winding on said converter connected to said mains, a booster mechanically connected to said converter, a field winding for said booster connected to said mains in parallel with said auxiliary commutating field winding, means for simultaneously varying the voltage applied to said booster field winding and the voltage applied to the auxiliary commutating field winding on said converter and for simultaneously reversing the booster field winding and the auxiliary commutating field winding so that said auxiliary commutating field winding opposes said series commutating field winding when the booster operates as a generator and assists said series commutating field winding when the booster operates as a motor, resistances in the circuit of the auxiliary commutating field winding, and means dependent on the load on said converter for cutting in and out said resistances in the auxiliary commutating field winding circuit.

13. In combination, direct current mains, a rotary converter having a series commutating field winding and an auxiliary commutating field winding, a booster mechanically connected to said converter having a field winding, two sets of resistances connected across said mains, said auxiliary commutating field winding of said converter being connected across one of said sets of resistances, said field winding of said booster being connected across the other of said sets of resistances, means for simultaneously changing the connections of said windings to said resistances and for simultaneously reversing said windings, resistances in the circuit of the auxiliary commutating field winding, and means dependent on the load on said converter for cutting in and out said resistances in the auxiliary commutating field winding circuit.

14. In combination, direct current mains, a rotary converter connected thereto having a series commutating field winding and an auxiliary commutating field winding, a booster mechanically connected to said converter having a field winding, means for simultaneously varying and simultaneously reversing the voltage applied to said auxiliary commutating field winding and the voltage applied to the field winding of said booster, resistances in the circuit of the auxiliary commutating field winding, and means connected across said series commutating field winding for cutting in and out said resistances in the auxiliary commutating field winding circuit.

15. In combination, direct current mains, a rotary converter, a series commutating field winding on said rotary converter, an auxiliary commutating field winding on said converter connected to said mains, a booster mechanically connected to said converter, a field winding for said booster connected to said mains in parallel with said auxiliary commutating field winding, means for simultaneously varying the voltage applied to said booster field winding and the voltage applied to the auxiliary commutating field winding on said converter and for simultaneously reversing the booster field winding and the auxiliary commutating field winding so that said auxiliary commutating field winding opposes said series commutating field winding when the booster operates as a generator and assists said series commutating field winding when the booster operates as a motor, resistances in the circuit of the auxiliary commutating field winding, and means connected across said series field winding for cutting in and out said resistances in the auxiliary commutating field winding circuit.

16. In combination, direct current mains, a rotary converter having a series commutating field winding and an auxiliary commutating field winding, a booster mechanically connected to said converter having a field winding, two sets of resistances connected across said mains, said auxiliary commutating field winding of said converter being connected across one of said sets of resistances, said field winding of said booster being connected across the other of said sets of resistances, means for simultaneously changing the connections of said windings to said resistances and for simultaneously reversing said windings, resistances in the circuit of the auxiliary commutating field winding, and means connected across said series commutating field winding for cutting in and out said resistances in the auxiliary commutating field winding circuit.

17. In combination, direct current mains, a rotary converter connected thereto having a series commutating field winding and an auxiliary commutating field winding, a booster mechanically connected to said converter having a field winding, means for simultaneously varying and simultaneously reversing the voltage applied to said auxiliary commutating field winding and the voltage applied to the field winding of said booster, resistances in the circuit of the auxiliary commutating field winding, and a plurality of relays for successively cutting in and out said resistances in the auxiliary commutating field winding circuit dependent upon the load on said converter.

18. In combination, direct current mains, a rotary converter, a series commutating field winding on said rotary converter, an auxiliary commutating field winding on said converter connected to said mains, a booster mechanically connected to said converter, a field winding for said booster connected to said mains in parallel with said auxiliary commutating field winding, means for simultaneously varying the voltage applied to said booster field winding and the voltage applied to the auxiliary commutating field winding on said converter and for simultaneously reversing the booster field winding and the auxiliary commutating field winding so that said auxiliary commutating field winding opposes said series commutating field winding when the booster operates as a generator and assists said series commutating field winding when the booster operates as a motor, resistances in the circuit of the auxiliary commutating field winding, and a plurality of relays for successively cutting in and out said resistances in the auxiliary commutating field winding circuit dependent upon the load on said converter.

19. In combination, direct current mains, a rotary converter having a series commutating field winding and an auxiliary commutating field winding, a booster mechanically connected to said converter having a field winding, two sets of resistances connected across said mains, said auxiliary commutating field winding of said converter being connected across one of said sets of resistances, said field winding of said booster being connected across the other of said sets of resistances, means for simultaneously changing the connections of said windings to said resistances and for simultaneously reversing said windings, resistances in the circuit of the auxiliary commutating field winding, and a plurality of relays for successively cutting in and out said resistances in the auxiliary commutating field winding circuit dependent upon the load on said converter.

20. In combination, direct current mains, a rotary converter connected thereto having a series commutating field winding and an auxiliary commutating field winding, a booster mechanically connected to said converter having a field winding, means for simultaneously varying and simultaneously reversing the voltage applied to said auxiliary commutating field winding and the voltage applied to the field winding of said booster, resistances in the circuit of the auxiliary commutating field winding, and a plurality of relays connected across said series field winding for successively cutting in and out said resistances in the auxiliary commutating field winding circuit.

21. In combination, direct current mains, a rotary converter, a series commutating field winding on said rotary converter, an auxiliary commutating field winding on said converter connected to said means, a booster mechanically connected to said converter, a field winding for said booster connected to said mains in parallel with said auxiliary commutating field winding, means for simultaneously varying the voltage applied to said booster field winding and the voltage applied to the auxiliary commutating field winding on said converter and for simultaneously reversing the booster field winding and the auxiliary commutating field winding so that said auxiliary commutating field winding opposes said series commutating field winding when the booster operates as a generator and assists said series commutating field winding when the booster operates as a motor, resistances in the circuit of the auxiliary commutating field winding, and a plurality of relays connected across said series field winding for successively cutting in and out said resistances in the auxiliary commutating field winding circuit.

22. In combination, direct current mains, a rotary converter having a series commutating field winding and an auxiliary commutating field winding, a booster mechanically connected to said converter having a field winding, two sets of resistances connected across said mains, said auxiliary commutating field winding of said converter being connected across one of said sets of resistances, said field winding of said booster being connected across the other of said sets of resistances, means for simultaneously changing the connections of said windings to said resistances and for simultaneously reversing said windings, resistances in the circuit of the auxiliary commutating field winding, and a plurality of relays connected across said series field winding for successively cutting in and out said resistances in the auxiliary commutating field winding circuit.

In witness whereof, I have hereunto set my hand this 16th day of October 1913.

HERMANN F. T. ERBEN.

Witnesses:
BENJAMIN B. HULL,
CHARLES W. HOWGATE.